Figure 1:
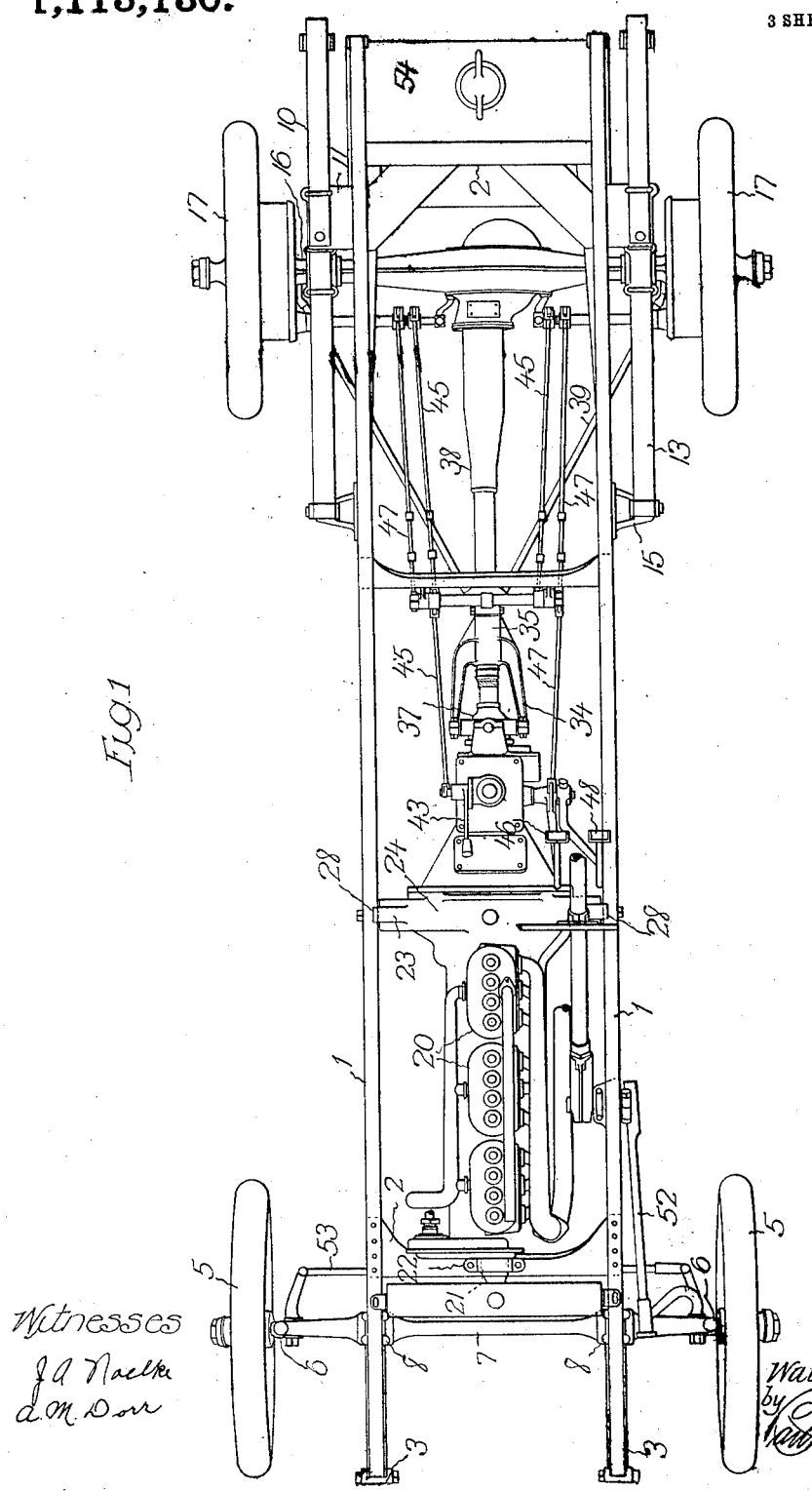

W. L. MARR.
MOTOR VEHICLE.
APPLICATION FILED APR. 28, 1913.

1,113,130.

Patented Oct. 6, 1914.
3 SHEETS—SHEET 1.

Witnesses
J. A. Naelke
L. M. Dorr

Inventor
Walter L. Marr

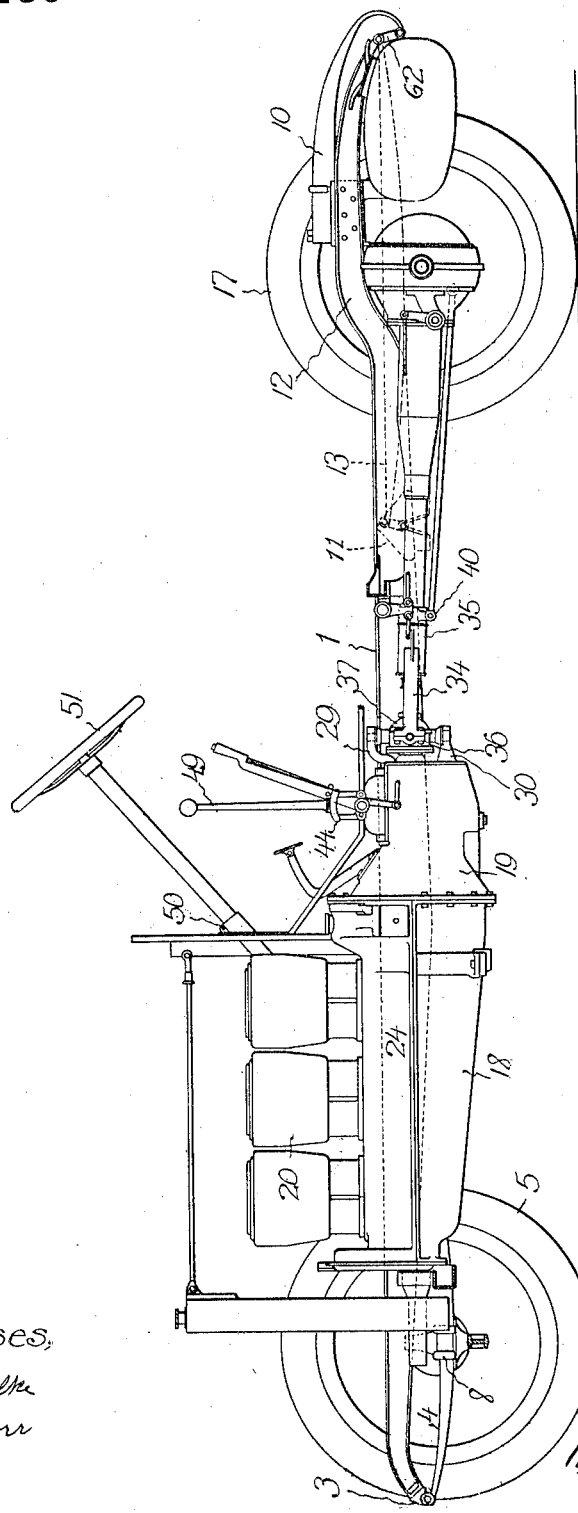

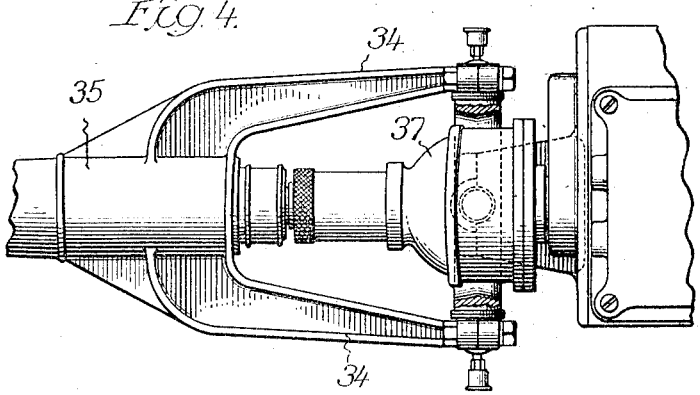
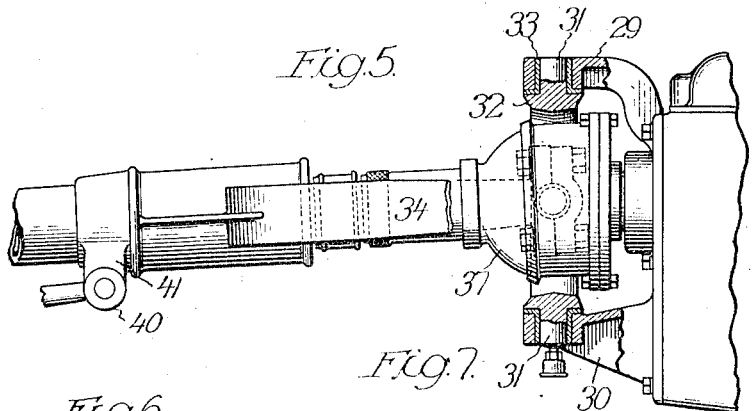
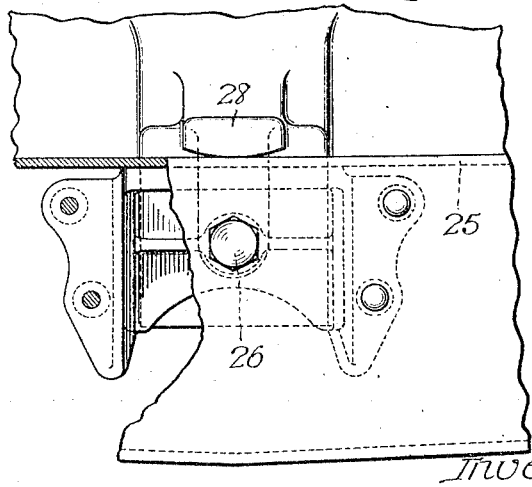

UNITED STATES PATENT OFFICE.

WALTER L. MARR, OF FLINT, MICHIGAN.

MOTOR-VEHICLE.

1,113,130.  Specification of Letters Patent.  Patented Oct. 6, 1914.

Application filed April 28, 1913. Serial No. 764,073.

*To all whom it may concern:*

Be it known that I, WALTER L. MARR, a citizen of the United States of America, residing at Flint, in the county of Genesee and State of Michigan, have invented certain new and useful Improvements in Motor-Vehicles, of which the following is a specification, reference being had therein to the accompanying drawings.

In the construction of automobiles it is desirable that the driving strains be transmitted in as direct a line as possible to and from the power plant and that the load springs be free to operate without any of these strains influencing their movements.

This invention relates to automobiles and to a construction thereof whereby the torque imparted to the driving wheels and the strains and stress while moving on the road are taken directly to and from the power plant without influencing the movement of the springs or imposing any strain upon the chassis that tends to rack it.

The invention consists in the matters hereinafter set forth and particularly pointed out in the appended claims.

In the drawings, Figure 1 is a plan view of an automobile chassis, power plant, and guide and traction bearing wheels that embody features of the invention; Fig. 2 is a view partially in side elevation and partially in section of the automobile; Fig. 3 is a view in detail of a spring suspension; Fig. 4 is a view, enlarged and in detail, of a universal connection of the torque tube; Fig. 5 is a view in detail taken at right angles to Fig. 4; and Figs. 6 and 7 are views in detail of a motor bracket arm and connection with the chassis.

Referring to the drawings, the side members 1 of a chassis which are held in spaced relation by suitably disposed transverse members 2, have forward depending goose necks 3 shackled or pivoted to half elliptic springs 4 whose rear ends are shackled or otherwise operatively coupled to the members 1 in the usual manner. Forward guide bearing wheels 5 are mounted on steering knuckles 6 of a front axle 7 on which the springs 4 are secured as by clips 8 or the like. Goose necks 10 or other rigid extensions of raised portions 12 of the side members, together with brackets 11, form hangers which are articulated by links or shackles 62 to the ends of springs 13. The central portions of the latter are rigidly secured to the outer tube 16 or casing of a rear drive axle that carries the usual differential shaft for traction bearing wheels 17 which are journaled on the axle.

A unit power plant is mounted on the forward portion of the chassis. Preferably this consists of a crank case 18 to which a transmission gear casing 19 is rigidly secured and on which a motor 20 of any approved type is secured with its main drive shaft disposed longitudinally and centrally of the chassis. A bearing sleeve 21 at the forward end of the base is pivotally mounted in a bearing 22 on the forward one of the cross members 2 of the chassis. Lateral bracket arms 23 from the base 24 of the motor 20 overlap the upper flanges 25 of the members 1 (see Figs. 6 and 7) and are pivotally secured thereto by suitably disposed studs 26 which pass through the webs of the members 1 and through reinforcing brackets 27, the extremities 28 of the arms being adapted to rock on the flanges 25.

An upper pintle bracket 29 and companion lower bracket 30 on the rear of the transmission casing 19 affords support for the pintles 31 of a gimbal thrust ring 32, suitable bushings 33 being interposed to take up end and side wear. The arms 34 of a thrust yoke 35 are provided at their ends with bearings 36 whereby they are journaled on said pintles, indicated at 37, of the ring 32. The body 38 of the thrust tube extends rearwardly to the axle casing 16 to which it is rigidly secured. Convergent braces 39 connect the outer portions of the axle 16 with the thrust tube 38, their forward ends being preferably pivoted as indicated at 40 to lugs 41 on the yoke 35.

Pairs of brakes indicated diagrammatically at 42 are operated through connections which are supported entirely on the drive axle thrust tube and the power plant. Thus an emergency brake lever 43 on the transmission casing 19 is latched to a quadrant 44 on the casing and is coupled through rock arm, thrust rod, rock shaft and link connections indicated at 45 with one set of brakes. A service brake pedal 46, likewise carried on the casing 19, is operatively connected through similar mechanism indicated at 47 with the other set of brakes. A clutch pedal 48 and change speed lever 49 are also mounted on the transmission casing 19 independently of the chassis. A steering wheel post 50 with steering wheel 51 and suitable connections, indicated at 52 and 53, with the steering knuckles 6, are mounted on the forward portion of the chassis. It is to be understood that suitable provisions for lubrication and other features incidental to good shop practice are added. As a matter of convenience a fuel tank 54 is hung between the rear portions 12 of the side members 1. A suitable driveshaft 55, with Cardan and universal joint, extends from the motor through the torque tube to a suitable differential driving mechanism in the rear axle for the traction wheels 17. One result of this construction is the freedom of the chassis and the springs from any thrust imparted by the traction bearing wheels as this is transmitted directly through the thrust tube to the power plant unit which is a rigid brace for the front end portion of the chassis frame. The method of attachment of the plant to the chassis precludes any racking of the latter through such driving strain. Because of the method of construction of the rear axle and its connection through the thrust tube with the power plant and the mounting thereon of all the brake connections and controlling mechanism, these latter parts are free from any adjustments that would otherwise be necessary if they were mounted on the chassis which moves independently of the rear driving axle and its connections. Thus the springs are free from everything but the load weight and this permits the use of a comparatively light chassis.

As there are no driving strains imposed upon the chassis save through its connection with the power plant it may be constructed with the minimum amount of bracing and so may be very light. The power plant is not subjected to strains due to the oscillation or weaving of the chassis under load and therefore does not tend to get out of alinement.

Obviously, changes in the details of construction may be made without departing from the spirit of my invention and I do not care to limit myself to any particular form or arrangement of parts.

What I claim is:—

1. In an automobile, a front axle, a rear axle casing, a rear axle in said casing, a chassis having the rear end thereof yieldingly supported on said axle casing, a power plant secured to the chassis and operatively connected to the rear axle, a rigid thrust member having a gimbal link connection with the power plant and secured to the rear axle casing to transmit driving thrust directly from the axle casing to the power plant, a brake mechanism on the rear axle casing provided with controlling members on the power plant and thrust member, and controlling mechanism for the power plant mounted thereon.

2. In an automobile, a front axle, a rear axle casing, a rear axle in said casing, a chassis, spring members articulated to the chassis and secured to the front axle and rear axle casing for yieldingly supporting the chassis thereon and permitting limited longitudinal movement of the chassis relative to the rear axle casing, a power plant secured to the chassis, a driving connection between the power plant and the rear axle, a rigid thrust member secured to the rear axle casing and having a gimbal ring connection with the power plant to transmit driving thrust directly thereto, brake operating mechanism supported on the rear axle casing, thrust member and power plant, and controlling mechanism for the power plant mounted thereon.

3. In an automobile, a chassis, a power plant pivoted centrally at its forward end to a forward transverse member of the chassis and at its sides to the side members of the chassis whereby limited angular movement of the side members of the chassis relative to the plant is permitted, a rear axle casing forming a housing for differential driving mechanism, a hollow thrust member rigidly secured to the rear axle casing and articulated to the power plant to transmit thrust from the rear axle casing to the power plant in line with the connection of the latter and the forward member of the chassis, brake mechanism mounted on the rear axle casing, thrust member and power plant, and springs secured on the rear axle casing and articulated to the chassis to oscillate longitudinally thereof.

4. In an automobile, a rear driving axle, a casing therefor, springs rigidly secured to the rear drive axle casing, a chassis, links articulating the springs to the chassis to permit limited longitudinal movement betwen them, a power plant pivoted at its forward end to a transverse member of the chassis and at its sides to side members thereof, a thrust member rigidly secured to the rear axle casing in longitudinal alinement with the front connection to the chassis, connected with a universal thrust joint at its forward end to the power plant, brake mechanism secured on the rear axle casing, thrust member and power plant, and driving connections extending from the power plant through the thrust member into the rear axle casing.

5. In an automobile, a chassis, a power plant pivotally secured at its forward end and at its sides to a transverse member and side members of the chassis respectively, a rear driving axle casing, springs longitudinally oscilliatory on the chassis rigidly mounted on the rear axle casing, a hollow thrust member extending forward from the rear axle casing to which it is rigidly secured, a yoke secured to the forward end of the thrust member and a gimbal ring connection between the yoke and the rear portion of the power plant in substantial alinement with the forward pivotal connection of the power plant and chassis.

6. In an automobile, a chassis, a power plant pivotally secured at its forward end and at its sides to a transverse member and side members of the chassis respectively, a rear driving axle casing, springs longitudinally oscillatory on the chassis rigidly mounted on the rear axle casing, a hollow thrust member extending forward from the rear axle casing to which it is rigidly secured, a yoke secured to the forward end of the thrust member, a gimbal ring connection between the yoke and the rear portion of the power plant in substantial alinement with the forward pivotal connection of the power plant and chassis, brake controlling members mounted on the power plant, and brake operating mechanism articulated to the controlling members and mounted on the thrust member and rear axle casing.

7. In an automobile, a rear driving axle casing, a chassis, links pivotally secured to the chassis, springs suspended at their ends by the links and secured between their ends to the rear axle casing, a hollow thrust member secured to the rear axle casing, a power plant mounted on the forward portion of the chassis having a forward pivotal connection with the transverse member thereof, a yoke secured rigidly to the forward portion of the thrust member, and a gimbal ring pivotally secured to the power plant and to the yoke to form a universal thrust joint between them.

8. In an automobile, a rear axle casing, a rear driving axle therein, a chassis, links pivotally secured to the chassis, springs suspended at their ends by the links and supported between their ends by the rear axle casing, a hollow thrust member supported by the rear axle casing, a power plant mounted on the forward portion of the chassis having a forward pivotal connection with a transverse member thereof, a yoke secured rigidly to the forward portion of the thrust member, a gimbal ring pivotally secured to the power plant and to the yoke to form a universal thrust joint between them, brake operating mechanism supported by the rear axle casing and thrust member and provided with operating members mounted on the power plant, and controlling members for the power plant mounted directly thereon.

In testimony whereof I affix my signature in presence of two witnesses.

WALTER L. MARR.

Witnesses:
ANNA M. DORR,
OTTO F. BARTH.